United States Patent [19]
Witte

[11] Patent Number: 5,581,700
[45] Date of Patent: Dec. 3, 1996

[54] HIERARCHICAL MULTIPLE PASSWORD ACCEPTANCE SYSTEM

[75] Inventor: Kendall C. Witte, Austin, Tex.

[73] Assignee: Dell U.S.A., L.P., Austin, Tex.

[21] Appl. No.: 514,044

[22] Filed: Aug. 11, 1995

[51] Int. Cl.$^6$ .............................. G06F 11/00; H04L 9/00; H04M 1/64

[52] U.S. Cl. ................ 395/188.01; 395/187.01; 380/4; 379/88

[58] Field of Search ............................. 395/188.01, 491, 395/728, 186, 187.01; 380/4, 24, 25, 49, 23; 379/88

[56] References Cited

U.S. PATENT DOCUMENTS

| | | | |
|---|---|---|---|
| 4,135,240 | 1/1979 | Ritchie | 395/491 |
| 4,328,542 | 5/1982 | Anastas et al. | 364/200 |
| 4,959,860 | 9/1990 | Watters et al. | 380/4 |
| 5,075,884 | 12/1991 | Sherman et al. | 395/650 |
| 5,097,506 | 3/1992 | Kaiser, Jr. et al. | 380/25 |
| 5,146,575 | 9/1992 | Nolan, Jr. | 395/491 |
| 5,222,135 | 6/1993 | Hardy et al. | 380/4 |
| 5,226,172 | 7/1993 | Seymour et al. | 395/800 |
| 5,265,221 | 11/1993 | Miller | 395/725 |
| 5,319,780 | 6/1994 | Catino et al. | 395/600 |
| 5,339,403 | 8/1994 | Parker | 395/425 |
| 5,428,795 | 6/1995 | Johnson et al. | 395/725 |
| 5,432,934 | 7/1995 | Levin et al. | 395/650 |

OTHER PUBLICATIONS

Lunt, Access Control Policies for Database Systems, Proceedings of the Second IFIP WG11.3 Workshop on Databse Security, Oct. 1989.

A Guide to Understanding Discretionary Access Control in Trusted Systems, National Computer Security Center (Fort Mead), Sep. 30, 1987.

Millen, Security Kernel Validation in Practice, Communications of the ACM, May 1976, at 243.

White, Fisch & Pooch, Computer System and Network Security, CRC Press 1995, at chapters 4 and 6, and pp. 132–133 and 136.

Kernighan & Pike, The UNIX Programming Environment, Prentice–Hall 1984, at 52–55 (su command).

Bell & LaPadula, Secure Computer Systems: A Mathematial Model—vol. II, Mitre Corporation Technical Report AD–771–543, Nov. 1973.

Graham & Denning, Protection—Principles and Practice, 1972 Joint Computer Conference, at 417.

Computer Dictionary, Microsoft Press 1994, at 141–42, 149–50, 419.

*Primary Examiner*—Robert W. Beausoliel, Jr.
*Assistant Examiner*—Norman M. Wright
*Attorney, Agent, or Firm*—Haynes and Boone, L.L.P.

[57] ABSTRACT

A computer has user IDs stored in a ROM, and user passwords associated with each stored user ID. A command from the CPU directs a coprocessor in the computer to read a password for a first ID. The coprocessor compares the password entered by the user with the password for the first ID. If the entered password matches the password for the first ID, the coprocessor reports that the password for the first ID was entered correctly. If the entered password does not match the password for the first ID, the coprocessor compares the entered password with a password for a second ID. If the entered password matches the password for the second ID, and if the second ID dominates the first ID, the coprocessor reports that the password for the first ID was entered correctly If the entered password does not match the password for the second ID, the coprocessor compares the entered password with a password for a third ID. If the entered password matches the password for the third ID, and if the third ID dominates the first ID, the coprocessor reports that the password for the first ID was entered correctly. This process continues until a match is found or there are no user IDs remaining.

13 Claims, 1 Drawing Sheet

HIERARCHICAL MULTIPLE PASSWORD ACCEPTANCE SYSTEM

TECHNICAL FIELD

This invention relates to computer systems, and more particularly to personal computers which provide multiple access domains.

BACKGROUND OF THE INVENTION

U.S. Pat. No. 4,959,860 discloses a power-on password security function for a personal computer. A battery-powered RAM storage area is used to hold the password when the system is turned off. However, it does not disclose access by multiple persons.

The ISC UNIX program provides that the password for the system administrator (root) could be entered when logging in as any user. However, this is implemented as part of the login program and is specific to that application.

System administrators or owners often need to act on behalf of end users of the machine, but they do not participate when the users' passwords are set. System administrators have their access to user's systems restricted when a user sets a password. Typically, the system administrator must identify himself to the system as the administrator, then use some roundabout fix; e.g., reset the user password.

What is needed is a simplified method for the administrator or owner to access a computer on behalf of someone else.

SUMMARY OF THE INVENTION

The foregoing problems are solved, and a technical advance is achieved, by the provision of an apparatus and a method for hierarchical password acceptance. This invention allows a hierarchy of privileged users, of which the system administrator and owner are two possibilities. The system administrator or owner need only enter his own password to act as the user. This invention allows the end user to have the password of his choice, but allows an owner or an administrator to have the exact access that a chosen end user would have.

A computer has user IDs stored in an EEROM, and user passwords associated with each stored user ID. A command from the CPU directs a coprocessor in the computer to read a password for a first ID. The coprocessor compares the password entered by the user with the password for the first ID. If the entered password matches the password for the first ID, the coprocessor reports that the password for the first ID was entered correctly. If the entered password does not match the password for the first ID, the coprocessor compares the entered password with a password for a second ID. If the entered password matches the password for the second ID, and if the second ID dominates the first ID, the coprocessor reports that the password for the first ID was entered correctly.

In another feature of the invention, the rights of the administrator include all those of an end user, and the rights of the owner include all those of the administrator.

In another feature of the invention, the passwords are processed in a secure processor, independent from the processor which runs the operating system and user applications.

BRIEF DESCRIPTION OF THE DRAWINGS

The above-noted and other aspects of the present invention will become more apparent from a description of the preferred embodiment when read in conjunction with the accompanying drawings. The drawings illustrate the preferred embodiment of the invention. In the drawings the same members have the same reference numerals.

DETAILED DESCRIPTION OF THE PREFERRED EMBODIMENT

Figure 1:
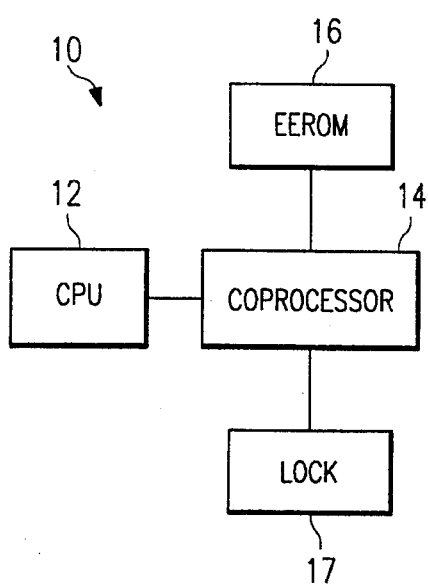
FIG. 1 is a schematic plan view of a computer employing an EEROM with stored passwords according to the present invention.

FIG. 1 is a schematic plan view of a computer 10 which includes a central processing unit, or CPU 12. The CPU 12 is conductively coupled to an input/output coprocessor 14, which in the preferred embodiment is an Intel Model No. 8051 processor. The coprocessor 14 handles the security functions of the computer 10. That is, when the owner, administrator, and end user input their passwords, the coprocessor 14 stores the passwords in a EEROM 16, which is conductively coupled to the coprocessor 14. The owner, administrator, and end user identities, IDs, are stored in the EEROM 16, but could also be stored in other locations. A locking device 17 is conductively coupled to the coprocessor 14, and is used by the coprocessor 14 to lock out the end user from certain functions of the computer 10 reserved for the owner or administrator, and to lock out the administrator from certain functions of the computer 10 reserved for the owner. The locking function can also be done by trustworthy software on the CPU; for example, the boot code.

Figure 2:
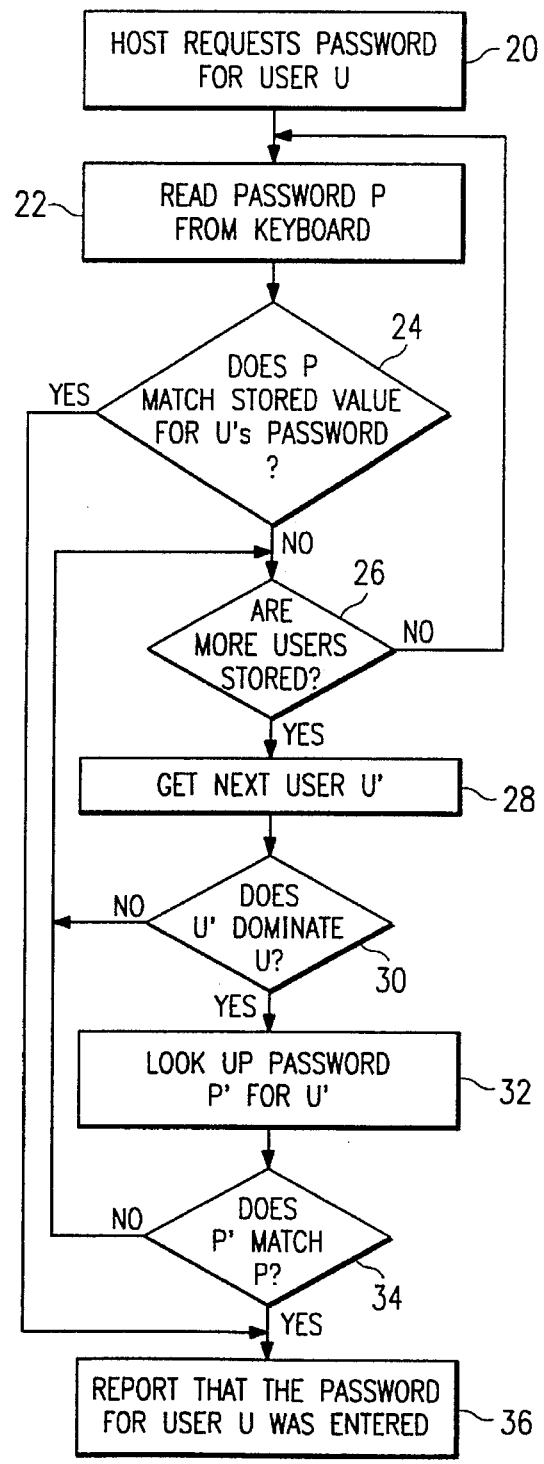
FIG. 2 is a flow chart depicting the method of the present invention.

Referring now to FIG. 2, a flow chart shows the method of the present invention. When a user attempts to use the computer 10, either upon power-on initialization, or upon a reboot initialization, the CPU 12 in step 20 commands the coprocessor 14 to require entry of a password for a user ID U. The CPU 12 may command the coprocessor 14 to require entry of a password to perform other functions. Depending on the attempted use, U may be the owner, an administrator, or merely a user. The owner is allowed any and all uses of the computer 10. The administrator is excluded from some of the owner's uses of the computer 10. The user is excluded from some of the owner's uses of the computer 10, and from some of the administrator's uses of the computer 10.

In response to the command of step 20, in step 22 the coprocessor 14 accepts entry of a password P. In step 24 the coprocessor 14 tests the password P to see if it matches the value stored in the EEROM 16 for the password of the user ID U. If it matches, then the coprocessor 14 is finished with the security check, as indicated in step 36. If it does not match, then in step 26 the coprocessor 14 checks the EEROM 16 to see if more user IDs are stored. If no more user IDs are stored in the EEROM 16, then the coprocessor 14 returns to step 22 to accept entry of other passwords.

If other user IDs are stored in the EEROM 16, then in step 28 the coprocessor 14 gets the next user ID U' from the EEROM 16. In step 30 the coprocessor 14 tests to see if the user ID U' dominates the user ID U. Owner dominates administrator, which dominates user. If the user ID U' does not dominate the user ID U, then the coprocessor 14 returns to step 26, and checks the EEROM 16 to see if more user IDs are stored. If the user ID U' does dominate the user ID U, then the coprocessor 14 looks up the password P' stored for the user ID U'. In step 34 the coprocessor 14 tests the password P to see if it matches the password P'. If it matches, then the coprocessor 14 is finished with the security check, as indicated in step 36. If it does not match, then the coprocessor 14 returns to the step 26 and accepts entry of another password.

In summary, when commanded to require entry of the administrator password the coprocessor 14 accepts entry of the administrator or owner passwords. When commanded to require entry of the owner password, the coprocessor 14 accepts entry of only the owner password.

Although an illustrative embodiment of the invention has been shown and described, other modifications, changes and substitutions are intended in the foregoing disclosure. For example, the invention is not limited to a hierarchy of only three levels. The hierarchy could contain as many levels as desired. The invention is not limited to a hierarchy; the ID's need only form a partial order. The passwords could be stored on a WORM drive, a tape drive, in an EPROM, or even in a battery-powered RAM. Accordingly, it is appropriate that the appended claims be construed broadly and consistently with the scope of the invention.

What is claimed is:

1. A method of controlling access to a requested function of a computer, a CPU of the computer requiring a user to verify that the user has the right to access the requested function, the computer having stored user IDs, and having separate a stored passwords associated with each stored user ID, comprising the steps of:

prompting the user to enter a password associated with a first user ID;

comparing the entered password with a first stored password from a first set of stored passwords associated with user IDs allowed to perform the requested function;

if the entered password matches the first stored password and is associated with the first ID, allowing the user to access the requested function;

if the entered password does not match the first stored password or is not associated with the first ID, repeating the comparing step for other stored passwords from the first set until either all stored passwords of the first set have been compared, or a match of both entered password and the first ID is found;

if the entered password and first ID does not match a stored password and its associated user ID of the first set, comparing the entered password with a second stored password from a second set of stored passwords with associated user IDs; and if the entered password matches the second stored password and a second ID associated with the second stored password dominates the first ID, then allowing access to the requested function and reporting that the password associated with the first ID has been entered.

2. A method of operating a computer having a hierarchy of stored user IDs and separate stored user passwords associated with each stored user ID, and wherein various functions of the computer are associated with different levels of the hierarchy, the method comprising the steps of:

upon initialization of the computer, comparing an entered user ID with the hierarchy of stored user IDs to determine the place of the entered user ID in the hierarchy of the stored user IDs;

if the entered user ID exists in the hierarchy of stored user IDs, then comparing an entered password with a first stored password associated with the entered user ID;

if the entered password matches the first stored password, then allowing operation of the computer by allowing the user to proceed;

if the entered password does not match the first stored password, comparing the entered password with a second stored password associated with a user ID of a level of the hierarchy above the place of the entered user ID in the hierarchy of stored user IDs:

if the entered password matches the second stored password then reporting that the first stored password has been entered and allowing operation of the computer by allowing the user to proceed; and locking the user out of the functions of the computer associated with levels of the hierarchy of stored user IDs above the place of the entered user ID in the hierarchy of stored user IDs.

3. A computer having an initialization password function for restricting access to the computer, comprising:

a CPU for requesting entry of user IDs and user passwords;

a EEROM for storing a hierarchy of stored user IDs, and a unique stored password associated with each stored user ID;

a coprocessor coupled to the CPU and to the EEROM, for reading a user ID and a user password entered by a user and comparing the entered user ID and password to the stored user IDs and stored passwords; and means for locking access to functions of the computer, as directed by the coprocessor.

4. The computer of claim 3, wherein the EEROM is an EPROM.

5. The computer of claim 3, wherein the EEROM is a WORM.

6. The computer of claim 3, wherein the EEROM is a battery-powered RAM.

7. The computer of claim 3, wherein the hierarchy has three levels.

8. A method of controlling access to a requested function of a computer, a CPU of the computer requiring a user to verify that the user has the right to access the requested function, the computer having user IDs and a password associated with each user ID stored therein, the method comprising:

prompting the user to enter a password associated with a first user ID;

comparing the entered password with a first stored password associated with the first user ID;

if the entered password matches the first stored password, allowing the user to access the requested function;

if the entered password does not match the first stored password, comparing the entered password with a second stored password associated with a second user ID; and if the entered password matches the second stored password and the second user ID dominates the first user ID, allowing the user to access the requested function and reporting that the password associated with the first user ID has been entered.

9. The method of claim 8 further comprising, if the second user ID does not dominate the first user ID, comparing the entered password with a next password associated with a next stored user ID.

10. The method of claim 9 further comprising repeating the step of comparing the entered password with a next password associated with a next stored user ID until a match is found or there are no more passwords to be compared.

11. The method of claim 9 further comprising repeating the step of comparing the entered password with a next password associated with a next stored user ID until a match is found or there are no more passwords to be compared.

12. The method of claim 8 further comprising, if the entered password does not match the second stored password, comparing the entered password with a next password associated with a next stored user ID.

13. Apparatus for controlling access to a requested function of a computer, a CPU of the computer requiring a user to verify that the user has the right to access the requested function, the computer having stored user IDs, and having a stored password associated with each stored user ID, the apparatus comprising:

- means for prompting the user to enter a password associated with a first user ID;
- means for comparing the entered password with a first stored password from a first set of stored passwords associated with user IDs allowed to perform the requested function;
- means for allowing the user to access the requested function if the entered password matches the first stored password and is associated with the first ID;
- means for repeating the comparing step for other stored passwords from the first set until either all stored passwords of the first set have been compared, or a match is found if the entered password does not match the first stored password;
- means for comparing the entered password with a second stored password from a second set of stored passwords with associated user IDs if the entered password does not match a stored password associated with the first ID of the first set; and
- means for allowing access to the requested function and reporting that the password associated with the first ID has been entered if the entered password matches the second stored password and a second ID associated with the second stored password dominates the first ID.

* * * * *